May 18, 1954 J. R. OISHEI 2,678,460
ADAPTER FOR WINDSHIELD WIPER MOTORS
Filed Aug. 30, 1949
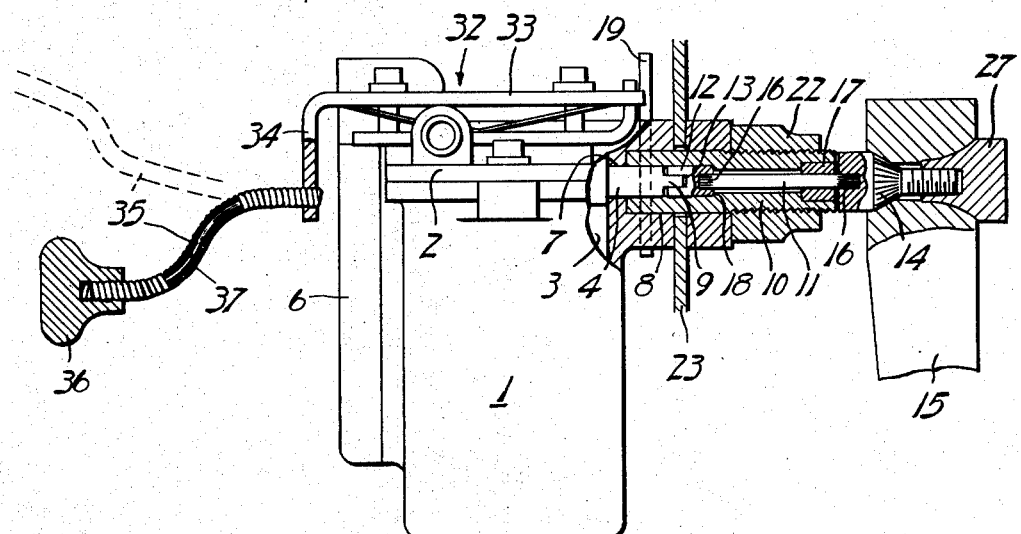
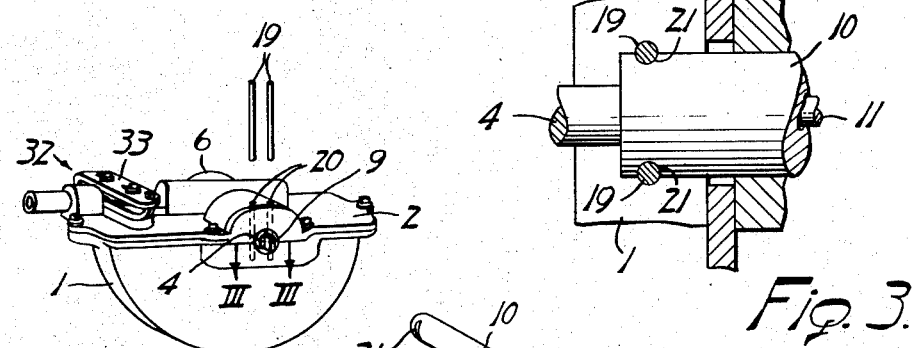
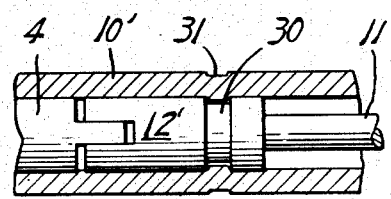
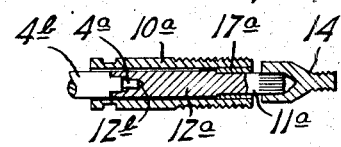
INVENTOR
John R. Oishei
BY
Bean, Brooks, Buckley & Bean
ATTORNEYS Patented May 18, 1954

2,678,460

UNITED STATES PATENT OFFICE 2,678,460

ADAPTER FOR WINDSHIELD WIPER MOTORS

John R. Oishei, Buffalo, N. Y., assignor to Trico Products Corporation, Buffalo, N. Y.

Application August 30, 1949, Serial No. 113,207

8 Claims. (Cl. 15—253)

This invention relates to the windshield cleaning art and has particular reference to the power or motor unit thereof.

The windshield cleaner most generally in use comprises, in its simplest form, a pneumatic motor having its shaft extended for mounting a wiper carrying arm. The more popular model has a mounting sleeve through which the shaft extends and by which the motor is mounted on the windshield by having only a single hole drilled therethrough. Due to the fact that the specifications of different automobiles vary and differ one from another, the windshield cleaners likewise vary in dimensional details, with the result that each make and model of car frequently require an individual cleaner specifically suited therefor, exclusive of other makes of automobiles. It is therefore quite apparent that over a period of years the changing specifications of the car builders reflect in an increased number of different models of windshield cleaners which have to be kept in stock, all being primarily the same but differing generally in characterizing features, such as the lengths of the shafts and their mounting sleeves, and sometimes in the lengths of the handles for the control valves.

An object of the present invention is to provide a windshield cleaner which will serve to reduce the over-all number of different models of windshield cleaner motors required to supply the demands of the car manufacturers as well as to minimize the number of motor units necessary to keep in stock for replacement, all tending toward an economy in the maufacture of the cleaner and greater ease of effecting replacement when occasion demands.

A further object of the invention is to provide a windshield cleaner which is more universal in its adaptation to the several models of vehicles and therefore one which has a greater degree of flexibility in its mounting to facilitate and expedite the installation of the individual cleaner in its particular setting.

The invention further has for its object to provide a windshield cleaner which, while being more universal in character, maintains its simple and practical construction without impairment of its efficient performance.

The foregoing and other objects will manifest themselves as the following description progresses, reference being made therein to the accompanying drawing, wherein:

Fig. 1 is a side elevation of the improved windshield cleaner motor with portions broken away;

Fig. 2 is an exploded view, in perspective, depicting the invention more clearly and illustrating another extension unit;

Fig. 3 is a cross-sectional view about on line 3—3 of Fig. 2; and

Figs. 4 and 5 are detailed fragmentary views of modifications of the shaft extension unit coupling.

Referring more particularly to the drawing, the numeral 1 designates the windshield cleaner motor casing or housing having a removable cover 2 and provided with a chamber to receive the piston or vane 3 which is fixed to the shaft 4 that is journaled in bearings at opposite sides of the chamber. The shaft at one end projects beyond its bearing into the automatic valve chamber 6 in a well known manner, while at the opposite end the shaft protrudes through its bearing 7 into a counterbore 8 where it preferably terminates in a position slightly inset with respect to the outer wall of the casing. This inset end of the shaft is formed with a coupling part 9 designed to be engaged by an extension unit which will serve to adapt the motor to its own individual installation.

Each extension unit is in the form of a mounting sleeve 10 and an extension shaft journaled therein, and while the extension unit may be of any suitable construction, the one herein illustrated is economical of production and simple in its makeup. As illustrated, the extension shaft comprises a reduced central section 11 and an enlarged head on each end, one head 12 being housed within the mounting sleeve and formed with a coupling part 13 for coacting with the coupling part 9 in uniting the two shafts in axial alignment while the opposite head 14 is arranged exteriorly of the mounting sleeve and adapted for operative connection to a wiper arm indicated at 15. The internal head 12 and the external head 14 in practice are formed separately from the shaft section 11 and are driven thereonto and secured with a pressed fit by reason of the knurling 16 on each end of the shaft section. The mounting sleeve 10 is counterbored at its opposite ends, the outer counterbore receiving a suitable bronze bushing 17 to afford a journal support for the outer end of the extension shaft adjacent the wiper arm, and the inner counterbore receiving the head 12 and providing an internal shoulder 18 which restricts endwise movement of the shaft part.

The extension unit is readily mounted on the motor by telescoping the counterbored inner end of the mounting sleeve over the motor shaft 4 and into the counterbore where it is firmly anchored in place by one or more anchor pins 19 which are inserted through the openings 20 of the motor casing and engaged in the peripheral chordal slots 21 on the inner end of the mounting sleeve. The anchoring pins 19 are preferably located inwardly from, but in proximity to, the engaged coupled parts so as to give rigidity and firm support to the joint. The formation of the coupling parts 9 and 13 is such that by and upon axial placement of the mounting sleeve within its counterbore, such coupling parts will be brought into a cooperative relationship for establishing a driving connection between the motor shaft and the extension shaft 11, 12, 14.

The outer end of the mounting sleeve is shown threaded to receive a clamping fastener 22 by which the motor may be secured to the framing structure 23 of the vehicle. The axial pull or thrust upon the mounting sleeve will bind upon the anchor pins 19 and secure them in position. The factory prescribed extension unit will convert the motor to the required model and adapt it for its particular location on the vehicle.

The external head will be shaped according to the type of wiper arm prescribed for the particular model of car. In Fig. 2, the head 14' is provided with a transverse opening 24 to receive a pin 25 by which a knurled head 26 is attached thereto. This head will fit the knurled socket of a well known wiper arm, but a nut 27 will secure the wiper arm 15 to the head 14. These heads are interchangeable at the factory. Otherwise, the internal and external heads are identical for the different extension units, the varying factor being in the length of the shaft section 11 which may be economically severed from wire stock and knurled for a drive fit with the heads. Or the internal head 12a may be formed in one piece with the shaft section 11a where a heavier construction is required.

The inner end of the extension shaft may have sufficient clearance to enable the internal head centering itself with respect to the motor shaft, which affords support therefor. This afforded support may be positively assured by having a supporting stub 4a formed axially on the driving or motor shaft 4b and engaging in a socket 12b in the internal head 12a, Fig. 5. In this modified showing, suitable clearance between the motor shaft and the extension shaft may be provided to secure free rotation of the shaft coupling between the spaced bearings 7 and 17a. The composition bronze bearing 17a may be elongated for this purpose and secured in place by a friction fit within the sleeve 10a.

If desired, the internal head 12' may be provided with a peripheral groove 30, Fig. 4, into which lugs 31 may be struck from the sleeve 10' in a manner to secure the extension shaft against axial movement within the sleeve, while permitting relative rotation.

In order to augment or further the universality of the motor mounting, or its flexibility of adaptation to the several designated makes or models of cars, and for accommodating the various prescriptions called for, the control of the motor is also readily fitted for the individual mount. Referring to Fig. 1, the control valve indicated generally at 32 and employed for operating the windshield cleaner as well as parking the same, has its slide member 33 provided with a downturned end 34 to which a handle is fastened. In the improved construction a manually shapeable shank 35 is engaged, as by threading it into an opening in the downturned end 34. A knob or handle 36 is threaded on the outer end of the shapeable shank. Limited adjustment of the shank at either end may therefore be effected. Preferably, however, the shank is in the form of a coiled body, wound from wire stock, and encloses a pliable core 37 secured therein against axial displacement therefrom. The coiled body is readily flexible, as is also the core, but the latter is made from a suitable wire stock pliable in character but capable of holding its manually imparted shape when pushed or pulled. The core gives to the coiled body sustaining support throughout its length as well as where the opposite ends of the body are threaded into the valve slide and the knob or handle. Therefore, a push or pull upon the knob will shift the control valve in the desired direction for closing or opening the motor communication with the source of pneumatic pressure, such as the intake manifold of the vehicle engine.

The windshield cleaner of the present invention is exceedingly practical in construction and has limited universal application while still maintaining the utmost simplicity of the system. A motor of this character is exceedingly economical since it is only necessary to manufacture the motor per se of a single design and then to associate it selectively with the interchangeable extension units of a kit or set which, when applied to the motor, will adapt it for installation on a predetermined vehicle.

The windshield cleaner of the present invention is admirably adapted for garages and service stations in that it is only necessary for the mechanic to carry in stock a very few motors as compared to a more numerous supply of extension units and handle shanks.

While the foregoing description has been given in detail, it is without thought of limitation since the inventive principles involved are capable of assuming other physical embodiments without departing from the spirit of the invention and the scope of the appended claims.

What is claimed is:

1. A windshield cleaner comprising a motor casing having a shaft bearing with a counterbore, a motor-driven shaft journaled in the bearing of the casing, one end of the shaft extending into the counterbore and terminating in an extension unit in the form of a mounting sleeve and a shaft journaled therein and permanently united therewith against axial displacement therefrom, one end of the mounting sleeve overhanging the adjacent end of the extension shaft and being axially placeable in the counterbore to enclose said one end of said motor shaft, the adjacent ends of the two shafts having parts interlockable by and upon such placement of the mounting sleeve, and anchor means engageable with the mounting sleeve after such placement for locking the latter in position and for indirectly securing the two shafts interlocked for movement in unison.

2. A windshield cleaner comprising a motor casing having a shaft bearing with a counterbore, a motor shaft journaled in the bearing of the casing, one end of the shaft terminating within the counterbore, an extension unit in the form of a mounting sleeve and a shaft journaled therein and permanently united therewith against axial displacement, one end of the mounting sleeve overhanging the adjacent end of its shaft and axially placeable in the counterbore to enclose said one end of said motor shaft, the adjacent ends of the two shafts having parts interlockable by an upon such placement of the mounting sleeve, and casing carried anchor means comprising anchor pins engageable with the mounting sleeve and with the counterbore wall on opposite sides of the motor shaft after such placement for locking the mounting sleeve in position and for indirectly securing the two shafts interlocked for movement in unison.

3. A windshield cleaner motor comprising a casing, a shaft journaled in the casing, a removable shaft extension unit in the form of a mounting sleeve and a shaft journaled therein and secured against axial displacement therefrom, said casing having a wall part adjacent its shaft for receiving said mounting sleeve, the adjacent ends of the two shafts having mating coupling parts operatively engageable one with another upon such placement of the unit on the casing, and anchor pin means on the casing movable through said wall part into interlocking engagement with the mounting sleeve for anchoring the extension unit to the casing in coupled position and through the sleeve acting to secure the coupled parts together.

4. A windshield cleaner comprising a motor casing having a removable cover and complemental shaft bearings in both parts with an external counterbore, a motor shaft journaled in the bearings of the casing with one end of the motor shaft extending into the counterbore, a shaft extension unit in the form of a mounting sleeve and a shaft journaled therein and permanently united therewith against axial displacement for mounting and demounting as a unit on the casing, the adjacent ends of the two shafts having parts interlockable by and upon placement of the mounting sleeve on the casing, the sleeve being axially placeable in the counterbore to engage said shaft parts, and anchor means holding the mounting sleeve in position and securing the two shafts interlocked for movement in unison.

5. A windshield cleaner motor comprising a casing having an external counterbore, a shaft journaled in the casing and extending into the counterbore, a removable shaft extension unit in the form of a mounting sleeve and a shaft journaled therein and secured against axial displacement therefrom, the adjacent end of the two shafts having mating coupling parts operatively engageable one with another upon placement of the unit in the counterbore, and anchor pin means on the casing movable through a wall of the counterbore into interlocking engagement with the mounting sleeve for anchoring the extension unit to the casing in coupled position and through the sleeve acting to secure the coupled parts together.

6. A windshield cleaner comprising a wiper, a motor therefor having a casing, a shaft journaled in a bearing in the casing with one end of the shaft extending into an external counterbore about the shaft bearing, a shaft extension unit in the form of a mounting sleeve and a shaft journaled therein and permanently united therewith against axial displacement, one end of the mounting sleeve being axially placeable in the counterbore, the adjacent ends of the two shafts having parts interlockable within the counterbore by and upon placement of the mounting sleeve therein, and anchor means on the casing engageable with the mounting sleeve in proximity to the coupled parts for locking the sleeve in position and securing the two shafts interlocked for movement in unison.

7. A windshield cleaner motor comprising a casing having a shaft bearing and an external counterbore about the bearing, a motor shaft journaled in the bearing of the casing and terminating at one end within the counterbore, a shaft extension unit in the form of a mounting sleeve and a shaft, said unit shaft having terminal heads joined by a reduced portion which latter is journaled in the sleeve, the two shafts having parts interlockable by and upon placement of the mounting sleeve in the counterbore, one part being on the motor shaft and the other part on one of the heads, the companion head having a part connectible to a wiper, and anchor means engageable with the mounting sleeve after placement for locking the latter in position and thereby securing the two shafts interlocked for movement in unison.

8. In a windshield wiper motor comprising a casing having a removable cover and complemental shaft bearings in both parts, a motor shaft journaled in the bearings, one end of the shaft being terminable within a shaft extension unit in the form of a mounting sleeve having an extension shaft journaled therein and permanently united therewith against axial displacement for mounting and demounting as a unit on the casing, said casing having a mounting part for receiving said sleeve with said shafts in axial alinement, said mounting sleeve serving thereby jointly as a journal support for the extension shaft and as a means for interlocking the extension shaft to the motor shaft, whereby the extension shaft will be supported for rotation by the motor shaft, the adjacent ends of the two shafts having parts interlockable by and upon placement of the mounting sleeve on the casing, and anchor means interconnecting the casing mounting part and the mounting sleeve for holding the mounting sleeve in position on the casing and the two shafts interlocked for movement in unison without displacing the removable cover from the chambered casing.

References Cited in the file of this patent

UNITED STATES PATENTS

| Number | Name | Date |
| --- | --- | --- |
| 531,882 | Stewart | Jan. 1, 1895 |
| 1,097,423 | Givens | May 19, 1914 |
| 1,537,273 | Tulley | May 12, 1925 |
| 1,564,514 | Blackmore | Dec. 8, 1925 |
| 1,860,281 | Gentil | May 24, 1932 |
| 1,964,400 | Horton | June 26, 1934 |
| 2,016,142 | Hansen et al. | Oct. 1, 1935 |
| 2,059,354 | Hueber | Nov. 3, 1936 |
| 2,372,930 | Bovee | Apr. 3, 1945 |
| 2,538,750 | Lappin et al. | Jan. 23, 1951 |